US010767993B2

(12) United States Patent
Kato (10) Patent No.: US 10,767,993 B2
(45) Date of Patent: Sep. 8, 2020

(54) MICRO-MECHANICAL SENSOR ELEMENT OF ANGULAR VELOCITY

(71) Applicant: MURATA MANUFACTURING CO., LTD., Nagaokakyo-shi, Kyoto (JP)

(72) Inventor: Yoshitaka Kato, Ishikawa (JP)

(73) Assignee: MURATA MANUFACTURING CO., LTD., Nagaokakyo-Shi, Kyoto (JP)

( * ) Notice: Subject to any disclaimer, the term of this patent is extended or adjusted under 35 U.S.C. 154(b) by 149 days.

(21) Appl. No.: 15/942,932

(22) Filed: Apr. 2, 2018

(65) Prior Publication Data

US 2018/0283869 A1 Oct. 4, 2018

(30) Foreign Application Priority Data

Apr. 4, 2017 (FI) ...................................... 20175310

(51) Int. Cl.
*G01C 19/5747* (2012.01)
*G01C 19/5769* (2012.01)
*G01C 19/5712* (2012.01)

(52) U.S. Cl.
CPC ..... *G01C 19/5747* (2013.01); *G01C 19/5712* (2013.01); *G01C 19/5769* (2013.01)

(58) Field of Classification Search
CPC ............ G01C 19/5747; G01C 19/5769; G01C 19/5719; G01C 19/5762; G01C 19/5712; G01C 19/574; G01C 19/5705
See application file for complete search history.

(56) References Cited

U.S. PATENT DOCUMENTS

| 7,134,337 B2 * | 11/2006 | Willig ................ G01C 19/5747 73/504.12 |
| 2010/0236327 A1 * | 9/2010 | Mao .................... G01C 19/5719 73/504.12 |

(Continued)

FOREIGN PATENT DOCUMENTS

| EP | 1 467 179 A2 | 10/2004 |
| JP | 2011053185 A | 3/2011 |
| WO | WO 2010/100333 A1 | 9/2010 |

OTHER PUBLICATIONS

European Search Report application No. EP18164446 dated Aug. 20, 2018.

(Continued)

*Primary Examiner* — Helen C Kwok
(74) *Attorney, Agent, or Firm* — Squire Patton Boggs (US) LLP (57) ABSTRACT

A sensor element, for detecting angular velocity about a detection axis perpendicular to a plane of the sensor element, comprises two primary masses and two Coriolis masses, and two sensing cells. Two coupling levers are each coupled to the two primary masses by first springs and to one of the two Coriolis masses by second springs. The coupling levers enable the primary masses and Coriolis masses to be excited into a combined primary motion in the plane of the planar sensor element. In the primary motion, a direction of angular momenta of linear primary oscillation motions of the primary masses and angular momenta of rotational primary motions of the coupling levers with respect to the geometrical centroid of the sensor element is opposite to the direction of the angular momenta of linear primary oscillation motions of the Coriolis masses with respect to the geometrical centroid of the sensor element.

20 Claims, 7 Drawing Sheets

(56) References Cited

U.S. PATENT DOCUMENTS

| | | |
|---|---|---|
| 2010/0313657 A1 | 12/2010 | Trusov et al. |
| 2011/0132087 A1 | 6/2011 | Ohms et al. |
| 2011/0185813 A1* | 8/2011 | Classen .............. G01C 19/5747 73/504.13 |
| 2012/0060604 A1* | 3/2012 | Neul .................... G01C 19/574 73/504.12 |
| 2012/0061172 A1* | 3/2012 | Yacine ............... G01C 19/5747 181/121 |
| 2012/0125099 A1* | 5/2012 | Scheben ............ G01C 19/5747 73/504.12 |
| 2013/0174661 A1* | 7/2013 | Kuhlmann ............. G01C 19/56 73/504.12 |
| 2016/0069682 A1* | 3/2016 | Balslink ............. G01C 19/5747 73/504.12 |
| 2016/0084654 A1 | 3/2016 | Senkal et al. |
| 2016/0334215 A1* | 11/2016 | Kato .................. G01C 19/5719 |

OTHER PUBLICATIONS

Finnish Search Report dated Nov. 3, 2017 corresponding to Finnish Patent Application No. 20175310.

Jun. 5, 2019 Office Action issued in Japanese Patent Application No. 2018-064860.

* cited by examiner

MICRO-MECHANICAL SENSOR ELEMENT OF ANGULAR VELOCITY

FIELD OF THE INVENTION

The present invention relates to measuring devices used in measuring angular velocity and specially to vibrating sensor elements for detecting angular velocity as defined in the independent claim 1. The present invention more particularly relates to a vibrating sensor element for detecting angular velocity about a single detection axis perpendicular to a plane of the essentially planar sensor element and to a sensor device comprising such sensor element. The present invention also relates to a method for operating a vibrating sensor element for detecting angular velocity as defined in the independent claim 12.

BACKGROUND OF THE INVENTION

Measuring angular velocity or angular rate (absolute value of an angular velocity vector) with a vibrating sensor of angular velocity is known to be a simple and reliable concept. In a vibrating sensor of angular velocity, a primary motion of vibrating mass/es is produced and maintained in the sensor. The motion to be measured is then detected as deviation from the primary motion.

International patent publication WO2010/100333 A1 discloses a micro-mechanical sensor of angular velocity comprising two masses coupled in the direction of a common axis.

In a MEMS gyroscope, mechanical oscillation is used as the primary movement, referred also to as the primary motion or the primary mode. When an oscillating gyroscope is subjected to an angular motion orthogonal to the direction of the primary motion, an undulating Coriolis force results. This creates a secondary oscillation, also referred to as the secondary motion, the detection motion, the sense mode or the secondary mode, which is orthogonal to the primary motion and/or to the axis of the angular motion, and at the frequency of the primary oscillation. The amplitude of this coupled oscillation can be used as the measure of the angular rate, i.e. the absolute value of angular velocity.

In a gyroscope device, combination of multiple moving masses may cause total angular momentum in addition to total linear momentum, both of which may cause some problems in the gyroscope device. For example, non-zero total momentum may cause instability of rate offset, rate signal noise, susceptibility to and/or interference with external mechanical shock and vibration.

BRIEF DESCRIPTION OF THE INVENTION

The object of the present invention is to provide a method and apparatus so as to overcome the prior art disadvantages and specifically to alleviate problems caused by non-zero total angular momentum. The objects of the present invention are achieved with a vibrating sensor element according to claim 1, and with a sensor device according to claim 20. The objects of the present invention are further achieved with a method according to claim 12.

The preferred embodiments of the invention are disclosed in the dependent claims.

All motions of the sensor element occur in the plane of the essentially planar sensor element, in other words, in the plane of the device. Thus, there are less dimensions to be taken into account in designing of the element if compared to a sensor element having more directions of motion enabled, and design of a well-balanced and low momentum sensor element is enabled.

The present invention has the advantage that the sensor element with a sensor element according to the claims the enables reliable measurement of angular velocity with good performance. Low total angular momentum reduces detectable vibration of the sensor element. Thus, no or very little vibrational energy leaks outside of the sensor element, which improves stability of sensor device Q-value.

According to a first aspect, a vibrating sensor element is provided. The vibrating sensor element comprises a supporting body, at least two primary masses and at least two Coriolis masses suspended to vibrate in respect of the supporting body, the primary masses and the Coriolis masses in a stationary suspended state forming a reference plane of the sensor element and at least two coupling lever structures, each of the coupling lever structures being coupled to the two primary masses and to one of the two Coriolis masses. The two primary masses are suspended to the supporting body by a spring structure that enables a linear primary oscillation motion of the two primary masses in a first direction along the reference plane, and disables motion of the two primary masses in other directions. Each of the two coupling lever structures is configured to relay an anti-phase primary motion of the two primary masses to a linear primary motion of the one coupled Coriolis mass. The linear primary oscillation motion of the one coupled Coriolis mass occurs in a second direction along the reference plane, which second direction is perpendicular to the first direction. The anti-phase primary motion of the two primary masses is relayed to an anti-phase primary motion of the two Coriolis masses by the coupling lever structures.

According to a second aspect, the two coupling lever structures are disposed symmetrically on opposite sides of a first symmetry axis of the sensor element traversing through the geometrical centroid of the sensor element.

According to a third aspect, the primary masses are disposed symmetrically on opposite sides of a second symmetry axis of the sensor element traversing through the geometrical centroid of the sensor element. The second symmetry axis is orthogonal to the first symmetry axis.

According to a fourth aspect, the sensor element further comprises means for exciting the two primary masses into the linear primary oscillation motions within the plane of the essentially planar sensor element along two parallel first axes having a non-zero distance from each other. The two coupling lever structures are coupled with first springs to the two primary masses and configured to mutually couple the linear primary oscillation motions of the primary masses, causing the linear primary oscillation motions of the primary masses to have mutually opposite phases at a first nominal frequency. The two coupling lever structures are further coupled with second springs to the two Coriolis masses and configured to relay the anti-phase primary oscillation motion of the primary masses into the anti-phase primary motions of the Coriolis masses at the first nominal frequency within the plane of the essentially planar sensor element along two parallel second axes having a non-zero distance from each other. The second axes of the anti-phase primary motions of the Coriolis masses are orthogonal to the first axes of the anti-phase primary motions of the primary masses, and the anti-phase primary motions of the Coriolis masses have mutually opposite phases at the first nominal frequency.

According to a fifth aspect, the ends of the coupling levers coupled to the primary masses and the Coriolis masses form an isosceles triangle, and/or each coupling lever comprises a second lever attached to a first lever in approximately middle of the length of the first lever, and the second lever and the first lever are attached in an angle of 90 degrees.

According to a sixth aspect, the combined primary mode has a total angular momentum that is less than 5% of the sum of the absolute values of the angular momenta of the two primary masses, the two coupling levers and the two Coriolis masses.

According to a seventh aspect, Coriolis masses are further configured to be excited by the Coriolis force into first anti-phase linear secondary motions within the plane of the essentially planar sensor element along a third axis orthogonal to the second axes of the anti-phase primary motions of the Coriolis masses, when the sensor is subject to angular velocity about the detection axis during operation.

According to an eighth aspect, the sensor element further comprises two sensing cells and the Coriolis masses are coupled to the sensing cells with third springs. The third springs cause the sensing cells to be excited into second anti-phase linear secondary motions along an axis aligned with the third axis of the first linear secondary motions of the Coriolis masses.

According to a ninth aspect, the sensing cells are mutually coupled with a second coupling arrangement disposed symmetrically on the first symmetry axis so that the second coupling arrangement extends an equal amount on both sides of the first symmetry axis. The second coupling arrangement causes the second anti-phase linear secondary motions of the sensing cells to have a second nominal frequency and the sensing cells to move in mutually opposite phases at the second nominal frequency.

According to a tenth aspect, the sensor element is a frequency separation type gyroscope and the second nominal frequency deviates from the first nominal frequency less than 25% of the first nominal frequency.

According to an eleventh aspect, the sensor element is a mode match type gyroscope and the second nominal frequency is essentially equal to the first nominal frequency.

According to a first method aspect, a method for operating a vibrating sensor element for detecting angular velocity about a detection axis perpendicular to a plane of the essentially planar sensor element is provided. The sensor element comprises a supporting body, at least two primary masses and at least two Coriolis masses suspended to vibrate in respect of the supporting body, the primary masses and the Coriolis masses in a stationary suspended state forming a reference plane of the sensor element, and at least two coupling lever structures, each of the coupling lever structures being coupled to the two primary masses and to one of the two Coriolis masses. The method comprises suspending the two primary masses to the supporting body by a spring structure that enables a linear primary oscillation motion of the two primary masses in a first direction along the reference plane, and disables motion of the two primary masses in other directions, and relaying, by each of the two coupling lever structures, an anti-phase primary motion of the two primary masses to a linear primary motion of the one coupled Coriolis mass. The linear primary oscillation motion of the one coupled Coriolis mass occurs in a second direction along the reference plane, which second direction is perpendicular to the first direction. The anti-phase primary motion of the two primary masses is relayed to an anti-phase primary motion of the two Coriolis masses by the coupling lever structures.

According to a second method aspect, the method further comprises exciting the two primary masses into the linear primary oscillation motions within the plane of the essentially planar sensor element along two parallel first axes having a non-zero distance from each other, coupling the two coupling lever structures with first springs to the two primary masses for mutually coupling the linear primary oscillation motions of the primary masses, causing the linear primary oscillation motions of the primary masses to have mutually opposite phases at the first nominal frequency, and coupling the two coupling lever structures with second springs to the two Coriolis masses for relaying the antiphase primary motion of the primary masses into the antiphase primary motions of the Coriolis masses at the first nominal frequency. The anti-phase primary oscillation motions of the Coriolis masses are configured to occur within the plane of the essentially planar sensor element along two parallel second axes having a non-zero distance from each other. The second axes of the anti-phase primary motions of the Coriolis masses are orthogonal to the first axes of the anti-phase primary motions of the primary masses. The anti-phase primary motions of the Coriolis masses have mutually opposite phases at the first nominal frequency.

According to a third method aspect, the combined primary mode has a total angular momentum that is less than 5% of the sum of the absolute values of the angular momenta of the two primary masses, the two coupling levers and the two Coriolis masses.

According to a fourth method aspect, the method further comprises exciting the Coriolis masses into the first antiphase linear secondary motions within the plane of the essentially planar sensor element along a third axis orthogonal to the second axes of the anti-phase primary motions of the Coriolis masses, when the sensor is subject to angular velocity about the detection axis during operation.

According to a fifth method aspect, the method further comprises coupling the Coriolis masses to sensing cells with third springs, the third springs causing the sensing cells to be excited into the second anti-phase linear secondary motions along an axis aligned with the third axis of the first linear secondary motions of the Coriolis masses.

According to a sixth method aspect, the method further comprises mutually coupling the sensing cells with a second coupling arrangement disposed symmetrically on the first symmetry axis. The second coupling arrangement extends an equal amount on both sides of the first symmetry axis. The second coupling arrangement causes the second antiphase linear secondary motions of the sensing cells to have a second nominal frequency and the sensing cells to move in mutually opposite phases at the second nominal frequency.

According to a seventh method aspect, the sensor element is a frequency separation type gyroscope and the second nominal frequency deviates from the first nominal frequency less than 25% of the first nominal frequency.

According to an eighth method aspect, the sensor element is a mode match type gyroscope and the second nominal frequency is essentially equal to the first nominal frequency.

According to yet another aspect, a sensor device comprises the sensor element of any of the first to eleventh aspects.

BRIEF DESCRIPTION OF THE FIGURES

In the following the invention will be described in greater detail, in connection with preferred embodiments, with reference to the attached drawings, in which.

DETAILED DESCRIPTION

As known to a skilled person, a MEMS sensor element may be an essentially planar structure, and the structure of the functional, moving elements of the sensor device may be illustrated in a plane. Terms "plane of the device", "plane of the essentially planar sensor element" and "plane of the masses", refer to a plane formed by moveable masses of a sensor device or a sensor element of a sensor device in their initial position when not excited to any movement. In the coordinates in the figures of this document, this plane corresponds to the xy-plane. The masses of a physical device have a non-zero thickness in direction of the z-axis. The plane should be understood to comprise a flat plane comprised within the thickness of the respective referred structural elements. When referring to symmetry of the sensor element, it should be noticed that this symmetry refers to the position of the moving elements when in equilibrium position, i.e. not excited to any motion causing displacement of the moving elements from their equilibrium position.

The term "sensor element" refers to the structural parts of a sensor device which actively participate in the sensing action. In addition to the actively moving sensor element parts, the sensor element may comprise passive structures. While referring to geometry of the sensor element, we refer to the structure of the active, moveable parts of the sensor element, such as moveable masses, springs and levers, and to fixed suspension structures directly suspending the moveable parts to the body of the sensor device.

The term "primary mass" refers to a seismic mass configured to be excited into a primary oscillation motion. When a primary mass is intended to have a linear primary oscillation motion, i.e. a longitudinal oscillation along a given axis, it may be also referred to as linearly moving mass. A primary mass is part of the sensor element.

The term "Coriolis mass" refers to a mass which is also configured to be excited into a primary oscillation motion, and in addition configured to go into a secondary oscillation due to Coriolis force. A Coriolis mass may also be called as a sensing mass, a sense mass or a detection mass. When a primary or a Coriolis mass is intended to have an essentially linear primary oscillation motion, i.e. a longitudinal oscillation along a given axis, it may also be referred to as linearly moving mass. A linearly moving Coriolis mass may have various secondary, sensing motion modes according to design and intended use of the sensor device. The secondary motion modes may comprise linear and/or rotational motion elements. A Coriolis mass is part of the sensor element.

The term "sensing cell" refers to a MEMS structure which comprises capacitive sensing combs for detection of motion of the sensing cell. Alternatively, a sensing cell may comprise piezoelectric sensing elements. A sensing cell is preferably configured to move only when secondary motion is present in the device, when the sensor device is subject to angular motion about the sensing axis. A sensing cell is part of the sensor element.

In an inertial MEMS device, spring structures are constructed from beams, which typically have a uniform cross-section. While MEMS technology is planar in nature, the dimensions of the beams are limited, especially in the z-axis dimension, also referred to as thickness. Length and width of the beam can be varied, as well as the shape. In this description, term "spring" is used for any kind of straight, folded or bent beam structure intended to work as a flexible spring. A spring may be configured flexible in one, two or three dimensions, depending on its purpose. For example, a spring may be a structure where a narrow beam has been folded one or more times, allowing a flexible movement in at least one direction. A straight beam may work as a spring, when its stiffness is low, allowing the beam to twist or bend, or to move torsionally.

The term "lever" refers to structures which are intended to be stiff in all dimensions, in other words not flexible like springs. Levers may be formed as beams or bars or as a combination of more than one beams or bars, or they may comprise more complex structures. Levers are considered as part of the sensor element.

Figure 1A:
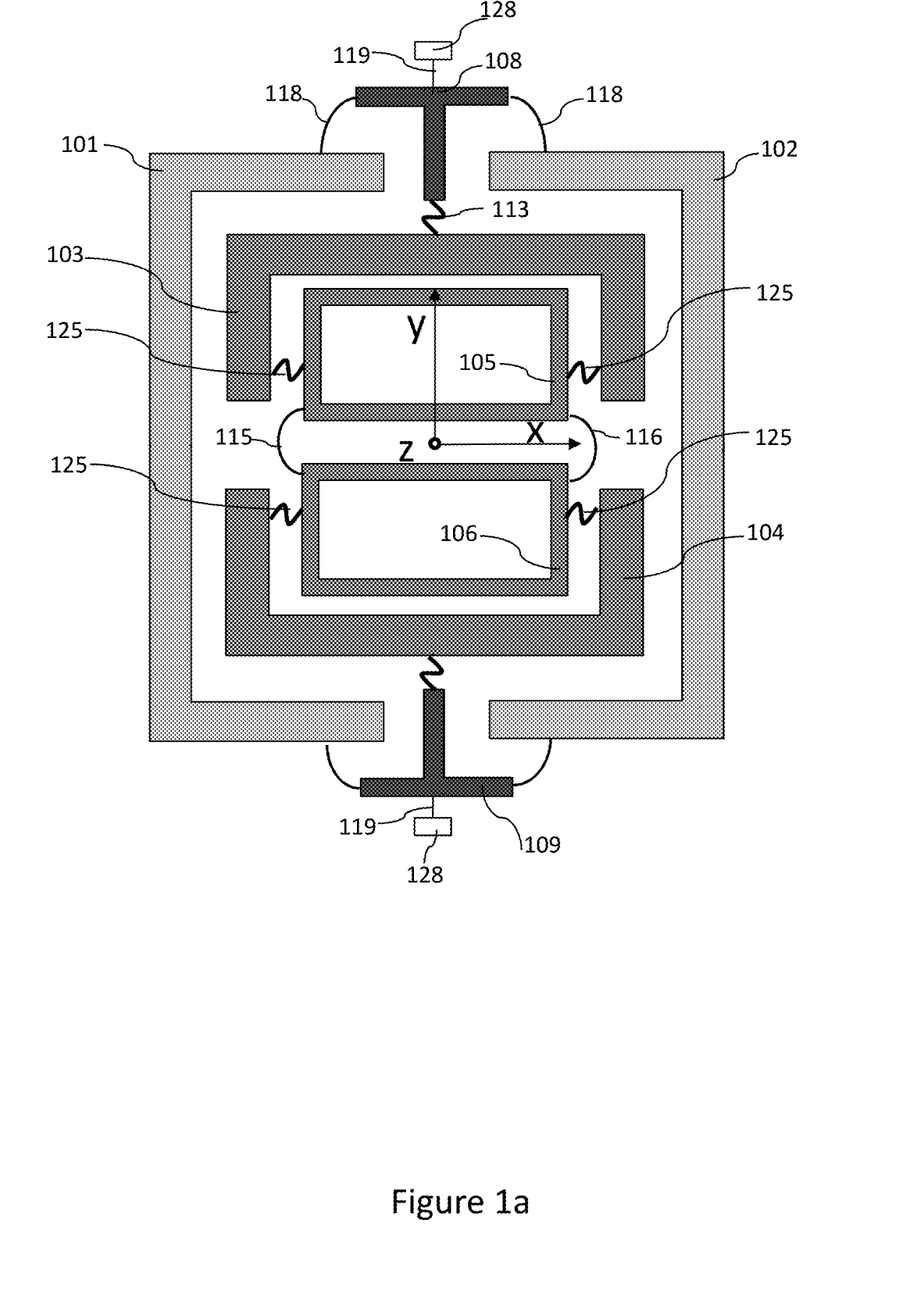
FIG. 1a shows schematically the main structural parts of an exemplary sensor element.

FIG. 1a shows schematically the main structural parts of an exemplary sensor element.

Figure 1B:
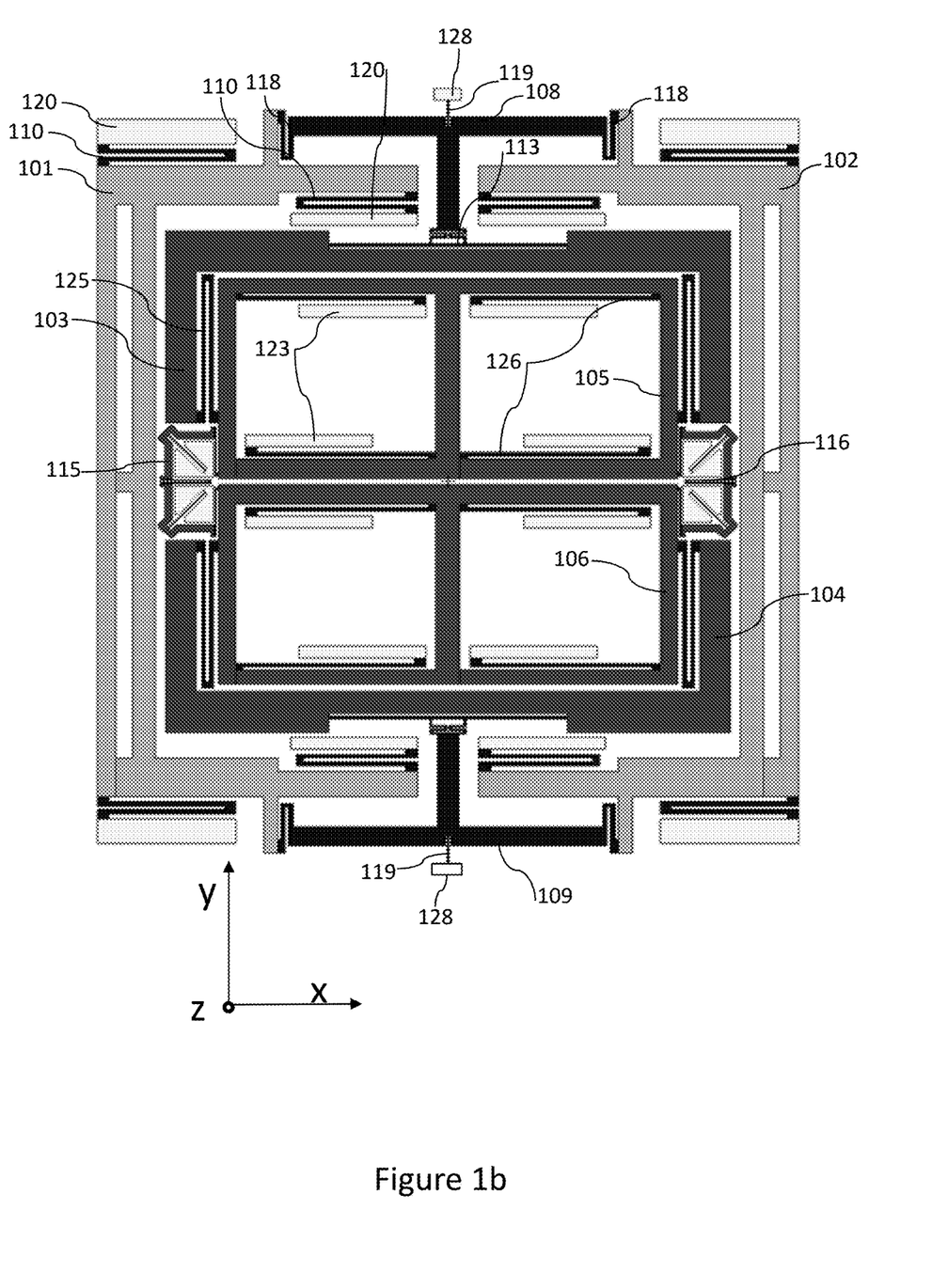
FIG. 1b shows an exemplary embodiment of a sensor element design.

FIG. 1b shows an exemplary embodiment of a sensor element design, with some more implementation details such as suspension structures. FIGS. 1a and 1b are described in parallel, and the common structural elements have same references when visible in each respective drawing. While these drawings aim to explaining the structure and the functionality of the inertial, moving elements within the sensor element, supporting body of the sensor element is not shown. The supporting body of the sensor may include for example a handle wafer underneath a device layer that is suspended above the handle wafer. The device layer includes movable parts of the sensor, including the structural parts described here.

The sensor element according to FIGS. 1a and 1b comprises two primary masses (101, 102), two Coriolis masses (103, 104), and two sensing cells (105, 106). The primary masses (101, 102) are excited to a primary motion in-plane. More particularly, the primary masses (101, 102) are excited into a linear primary oscillation motion occurring in the plane of the masses in direction of the y-axis. In other words, the primary masses (101, 102) are configured to move along two parallel axes which are separated from each other by a non-zero distance and which axes are also parallel with a symmetry axis of the sensor element, which traverses in the y-axis direction through a geometric centroid of the sensor element. With the direction of the y-axis it's meant that the motion is intended to occur primarily in the direction of the y-axis, although some deviation of this direction may occur i.e. due to non-idealities of a physical device. Deviation from the exact intended direction within normal working tolerances is allowed without departing from the scope. The two primary masses (101, 102) are preferably disposed symmetrically on opposite sides of a symmetry axis of the sensor element, which traverses through the geometrical centroid in the y-axis direction.

The two Coriolis masses (103, 104) are also excited to a linear primary motion in-plane. More particularly, the Coriolis masses (103, 104) are excited into a linear primary oscillation motion occurring in the plane of the masses in direction of the x-axis. In other words, the Coriolis masses (103, 104) are configured to move along two parallel axes which are separated from each other by a non-zero distance and which axes are also parallel with a symmetry axis of the sensor element, which traverses in the x-axis direction through the geometric centroid of the sensor element. Thus, the axes of the linear primary oscillation motion of the Coriolis masses (103, 104) are perpendicular to the axes of the linear primary oscillation motion of the primary masses (101, 102). The two Coriolis masses (103, 104) are preferably disposed symmetrically on opposite sides of a symmetry axis of the sensor element, which traverses through the geometrical centroid in the x-axis direction.

A first coupling arrangement comprising a number of first and second springs (118, 113) and two coupling levers (108, 109) couples the primary oscillation motion of primary masses (101, 102) and Coriolis masses (103, 104) with each other. Preferably, only the primary masses (101, 102) are each excited to the linear primary motion with driving electrodes, such as capacitive comb electrodes or piezoelectric electrodes. These driving electrodes are not shown in the drawings. The linear primary motions of the primary masses (101, 102) are coupled towards the Coriolis masses (103, 104) through the first coupling arrangement, causing the Coriolis masses (103, 104) to be coupled into their characteristic, intended linear primary motions.

When angular velocity about the z-axis affects the Coriolis masses (103, 104) oscillating in the x-axis direction, an undulating Coriolis force is caused in the y-axis direction, and the Coriolis masses (103, 104) start a secondary motion in the y-axis direction. Two sensing cells (105, 106) are coupled to the two Coriolis masses (103, 104) by fifth springs (125), one sensing cell to one Coriolis mass respectfully. Two sensing cells (105, 106) are preferably disposed symmetrically on the opposite sides of the symmetry axis of the sensor element, which traverses through the geometrical centroid in the x-axis direction. When primary motion is present but the sensor element is not subject to any angular velocity about the z-axis, the primary masses (101, 102) and Coriolis masses (103, 104) move in the primary motion, but the sensing cells (105, 106) remain stationary. When the sensor element is subject to angular velocity about the z-axis, the Coriolis masses (103, 104) start moving in direction of the y-axis due to the Coriolis force. This secondary motion is coupled to the sensing cells (105, 106) by fifth springs (125), so that the sensing cells (105, 106) also start a secondary motion in y-axis direction. Sensing cells (105, 106) are mutually coupled with second coupling arrangements (115, 116) which causes the sensing cells (105, 106) to move in opposite phases when the frequency of the secondary motion corresponds to that of the primary motion. Structural elements participating the secondary motion and the motion thereof will be described below in more detail. Sensing cells (105, 106) may include capacitive sensing comb structures (not shown), from which an electrical signal is obtained which provides information about the detected angular rate about the z-axis to which the sensor element is subject to.

As illustrated in FIG. 1*b*, the primary masses (101, 102) are supported to the body of the sensor element by first suspending structures (120), which may in short be called anchors, using supporting springs (110) between the suspending structures (120) and the primary masses (101, 102). Supporting springs (110) are configured with a relatively low spring constant in the y-axis direction, thus allowing the primary masses (101, 102) move in the y-axis direction, but not in other directions. Especially, supporting springs (110) have a high spring constant in the x-axis direction so that they practically disable motion of the primary masses (101, 102) in the x-axis direction. Beneficially, supporting springs (110) are arranged symmetrically in view of both symmetry axes of the sensor element traversing through the geometrical centroid of the sensor element and aligned with the y-axis and the x-axis, in order to facilitate a well equalized primary motion of the primary masses (101, 102). In other words, mean of the first suspending structures (120) in the x-axis dimension is preferably along the x-axis traversing a geometrical centroid of the sensor element design in the xy-plane, and mean of the first suspending structures (120) in the y-axis dimension is preferably along the y-axis along the geometrical centroid of the sensor element. In this arrangement, the linear primary motion of the primary masses (101, 102) occurs in the plane of the primary masses, in the xy-plane, also called the plane of the device. The plane of the primary masses (101, 102), which also corresponds to the plane of the entire sensor element means the plane formed by the moveable parts of the sensor element when in rest, i.e. when not excited to any movement.

The sensor element may be excited through capacitive excitation combs arranged but any other method and structure for exciting the device may be used as known by a man skilled in the art. For example, piezoelectric excitation may alternatively be used. The primary oscillation motion and is further explained in relation to FIGS. 4*a* and 4*b*.

Each of the Coriolis masses (103, 104) is coupled with both two primary masses (101, 102) with the first coupling arrangement comprising two coupling levers (108, 109) and first and second springs (118, 113) coupling each coupling lever to one Coriolis mass and to both primary masses. In the examples shown in FIGS. 1*a* and 1*b*, two essentially uniform and straight stiff bars form each coupling lever (108, 109). However, sections of a coupling lever may be of any shape, as long as outer ends of the stiff sections in each coupling lever (108, 109) form an isosceles triangle. The two coupling levers (108, 109) are preferably disposed symmetrically with respect to a symmetry axis of the device traversing through the geometrical centroid in the x-axis direction. Further, each coupling lever (108, 109) is preferably disposed in symmetrical manner on the y-axis direction symmetry axis of the sensor element so that the symmetry axis of the coupling lever itself and the symmetry axis are aligned. Each coupling lever (108, 109) is coupled to both primary masses (101, 102) with two first springs (118) disposed symmetrically at the ends of the horizontal (x-direction) part of the coupling lever. Each coupling lever (108, 109) is further coupled with a second springs (113) with one of the Coriolis masses (103, 104). The coupling points of the first springs (118) and the primary masses (101, 102) and the second springs (113) are preferable disposed symmetrically with respect to the symmetry axis of the device traversing through the geometrical centroid in the y-axis direction. Symmetrical coupling of the elements facilitates symmetrical coupling of movement of the primary masses (101, 102) through the coupling lever (108, 109) towards the respective Coriolis masses (103, 104), enabling a balanced and linear primary motions for the Coriolis masses (103, 104) along two parallel axes which have a non-zero distance from each other. Each of the coupling levers (108, 109) is further coupled to a suspension structure (128) with a fourth spring (119). The connection point of the fourth spring (119) and the respective coupling lever (108, 109) is preferably disposed at the symmetry axis of the sensor element that is in the y-axis direction. The fourth spring (119) allows the coupling lever (108, 109) to rotate about the connection point of the fourth spring (119) but disable linear movement of the coupling levers in the x-axis or y-axis directions.

The two sensing cells (105, 106) are coupled with the Coriolis masses (103, 104) with fifth springs (125). These fifth springs (125) have a low spring constant in the x-axis direction, so that linear primary motion of the Coriolis frames (103, 104) in the x-axis direction does not cause any significant movement of the sensing cells (105, 106) in the x-axis direction. The fifth springs (125) have a high spring constant in the y-axis direction. Thus, any Coriolis force induced secondary motion of the Coriolis frames (103, 104) in the y-axis direction is efficiently coupled towards the sensing cells (105, 106) through the fifth springs (125). Sensing cells (105, 106) are further coupled to a number of second suspension structures (123) with sixth springs (126). Sixth springs (126) have a low spring constant only in the y-axis direction, thus allowing the sensing cells (105, 106) move in the y-axis direction, but preventing movement in other directions. Thus, sixth springs (126) balance and equalize the secondary motion of the sensing cells (105, 106). As described above, the primary masses (101, 102) are suspended to the immovable body or housing of the sensor element by at least one first suspending structure (120) in a symmetrical manner. Similarly, the sensing cells (105, 106) are suspended to the body of the sensor element in a symmetrical manner. In the x-axis dimension, mean of the second suspending structure (123) positions of the sensing cells (105, 106) should preferably be the same as a mean of the first suspending structure (120) positions of the primary (101, 102) masses both in the x-axis and in the y-axis dimensions.

The first coupling arrangement with the coupling levers (108, 109) is configured for coupling the primary motion of the primary masses (101, 102) and the primary motion of the Coriolis masses (103, 104) into the desired combined primary motion. The two linearly moving primary masses (101, 102) are coupled to each other by the horizontal bars of the coupling levers (108, 109), which are stiff, i.e. not capable to any significant bending or twisting. Each coupling lever (108, 109) is coupled to the two linearly moving primary masses (101, 102) with first springs (118). If the primary masses (101, 102) were made of just one piece each, the first springs (118) would be coupled to the mass itself, as shown in FIGS. 1*a* and 1*b*. In the example of FIGS. 1*a* and 1*b*, coupling levers are disposed on two opposite sides of sensor element so that the horizontal bars of the coupling levers form part of the outer periphery of the sensor elements moveable parts. MEMS structures forming the levers, springs and masses are preferably manufactured during same manufacturing steps, i.e. there is no particular "coupling", "attaching" or "connecting" required for mutually coupling the levers, springs and masses, but they may be formed through a patterning process such as masking and etching process or an epitaxial growing process on a single silicon wafer, where all moveable sensor structures may be created using at least some common manufacturing process steps.

In the example of FIGS. 1*a* and 1*b*, the x-axis traversing through the geometrical centroid of the structure can be considered to form a first symmetry axis of the sensor element and the y-axis traversing through the geometrical centroid of the structure can be considered to form a second symmetry axis of the centroid element. The two coupling levers (108, 109) are preferably disposed in symmetrical positions in view of the first symmetry axis when the device is in rest, so that the Coriolis masses (103, 104) are disposed essentially between the coupling levers, and the coupling levers are disposed opposite to each other on two opposite sides of the combined Coriolis mass structure, symmetrically in view of the first symmetry axis. Not all suspending and protecting device body parts are shown in these figures for clarity, but these are understood to exist i.e. under or on top of the sensor element. The sensor element may comprise further structural parts, such as driving and detection combs and/or springs or other types of driving and detection elements, additional suspension structures etc. For clarity, not all of these structures and element are shown in the schematic presentation of FIGS. 1*a* and 1*b*, but only the parts necessary to understand the claimed invention.

It may be noticed that the sensor element according to the exemplary embodiment of FIG. 1*b* is, in the equilibrium state, symmetrical in view of two mutually perpendicular axes: the x-axis and the y-axis traversing through the geometrical centre of the sensor element. The sensing axis of the single axis gyroscope element, namely the z-axis may be considered to traverse through the sensor element in this common origin. A symmetrical layout facilitates well balanced and equalized linear oscillations.

Figure 2:
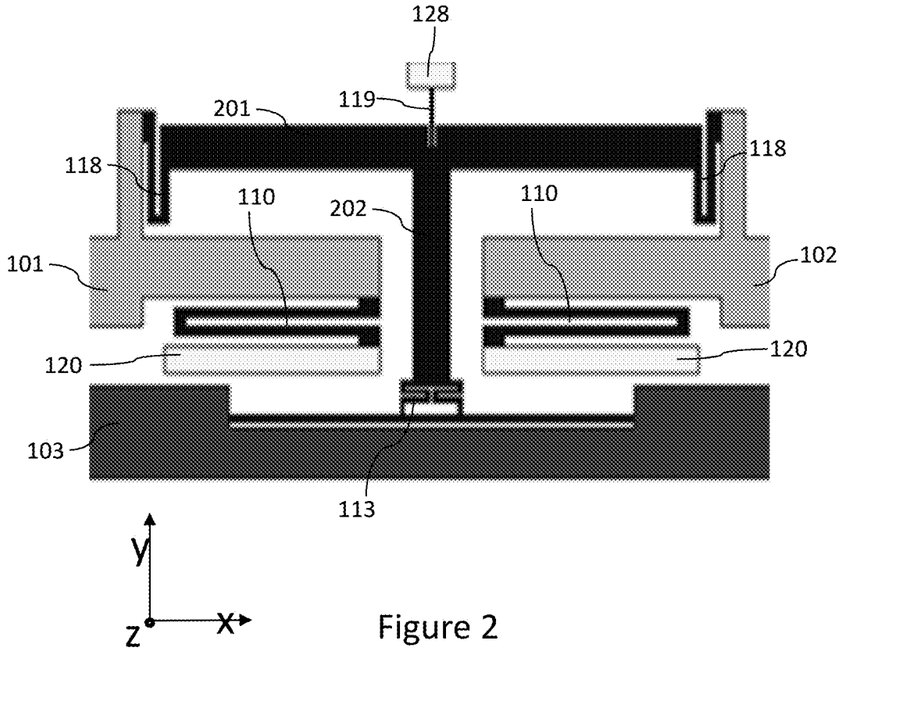
FIG. 2 shows an enlarged view to an exemplary coupling lever.

FIG. 2 shows an enlarged view to the exemplary coupling lever of FIG. 1*b*. In this example, each coupling lever may be considered to be constructed from a first lever or first bar (201) and a second lever or second bar (202), wherein the first lever forms the horizontal bar of the "T-shape", and the second lever forms the vertical "leg" of the coupling lever (108, 109). The first lever (201) and the second lever (202) are essentially stiff structures, which do not deform due forces affecting them during normal primary and secondary motion within the given operating condition limits. It should be understood that the structure of the coupling lever may have some variations without departing from the invention. Variations may be caused by some non-idealities in manufacturing process, or they may be intentional. The second lever (202) is preferably attached to the respective first lever (201) in an angle of 90 degrees, but the angle may vary slightly without significantly changing the functionality of the coupling lever. Similarly, the position of the second lever (202) may not be in the absolutely middle of the respective first lever (201), but may be slightly aside. Vertices between the levers or any corner in a bend of a beam/spring forming the coupling lever may be sharp, or there may be some rounding or i.e. fillets in the vertices. In a MEMS manufacturing process, some sharp corners may become slightly smoothed out by fillets even without any design measures. On the other hand, fillets may even be designed in the vertices in purpose of relieving stress in the vertex area. There may be some intentionally added material in the vertex area i.e. for stress relief or for increasing stiffness of the coupling lever. Further, the first and second levers may comprise beams that are not uniform in cross-section. The first levers and/or the second levers forming the "T-shape" may even be curved or comprise curved or bent sections. Any variation of the coupling lever is within the scope, as long as the three ends of the coupling lever coupled to the respective primary and Coriolis masses (101, 102, 103; 101, 102, 104) form an isosceles triangle, so that the distances between each end of the first lever (201) and the end of the second lever (202 respectively) are essentially equal.

Figure 3:
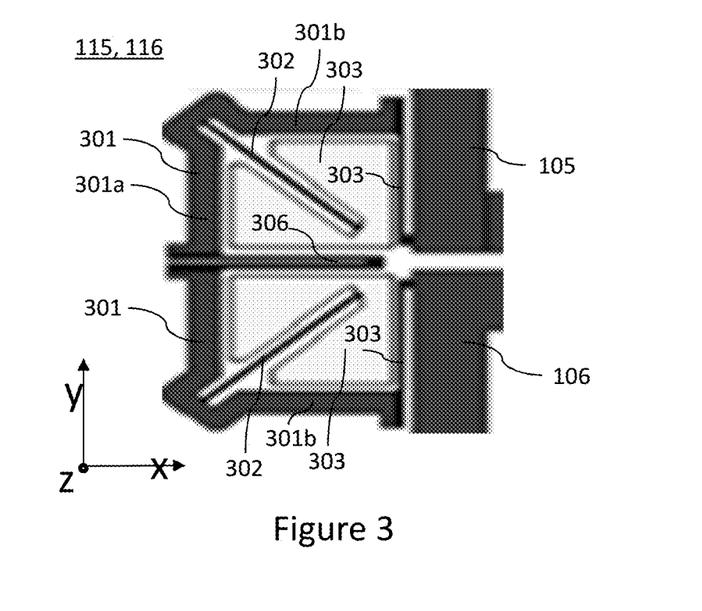
FIG. 3 shows an enlarged view of a second coupling arrangement.

FIG. 3 shows an enlarged view to one of the second coupling arrangements (115, 116) mutually coupling the two sensing cells (105, 106). Similar second coupling arrangements are disposed essentially between the sensing cells (105, 106) symmetrically with respect to the symmetry axes of the sensor element. Preferably, each of the two second coupling arrangements are disposed on the x-axis direction symmetry axis of the sensor element, extending an equally long side to both sides of th symmetry axis. One purpose of the second coupling arrangements (115, 116) is to facilitate secondary movement of the sensing cells (105, 106) in opposite phases but to reduce likelihood of the sensing cells (105, 106) to move in the same phase. Such functionality may be achieved by designing the masses of the sensing cells (105, 106) and the Coriolis masses (103, 104) and spring constants of the second coupling arrangements (115, 116) suitably, so that the nominal frequency of the secondary motion of the sensing cells is essentially equal or close to that of the nominal frequency of the primary motion. For example, the nominal frequency of the secondary motion may deviate by less than 25% from the nominal frequency of the primary motion.

Each of the second coupling arrangements (115, 116) comprise two essentially L-shaped levers (301) and supporting and connecting beams (302, 303, 306). As shown in the FIG. 3, the L-shaped levers (301) have at least two essentially straight, long sections (301a, 031b) which may be disposed in essentially 90-degree angle with respect to each other. The essentially L-shaped levers (301) may comprise additional bends, such as illustrated in the middle section (bend section) of the essentially L-shaped lever (301) in the FIG. 3 without departing from the scope. We will call these levers as the L-shaped levers (301) for simplicity. Each L-shaped lever (301) is preferably supported by a supporting beam (302) coupled to the L-shaped lever (301) at the middle of the L-shaped lever (301) so that the L-shaped lever (301) can only rotate around the Z-axis in reference to the other end of the supporting beam (302), but does not have any other degrees of freedom in terms of linear motion. The other end of the supporting beam (302) is coupled to a third suspending structure (303). The supporting beam (302) may be oblique compared to the straight, long sections of the respective L-shaped lever (301).

The end of the L-shaped lever (301) facing the adjacent sensing cell is coupled to the respective sensing cell (105, 106) by a connecting beam (305), and the two adjacent L-shaped levers (301) are coupled to each other from the end of the L-shaped lever (301) facing the other L-shaped lever (301) with a folding beam (306). The folding beam (306) is preferably coupled symmetrically between the two L-shaped levers (301).

The L-shaped lever (301) essentially converts the direction of the Y-axis direction sensing motion originating from the sensing cell (105, 106) to an X-axis direction movement of the other end of the L-shaped lever (301), while the L-shaped lever (301) is rotating. Since the L-shaped levers (301) are coupled to each other via the folding beam (306) that limits flexibility along the X-axis in terms of relative displacement between two L-shaped levers (301), the end of two L-shaped levers (301) facing each other can only move always same way in the X-axis direction. Thus, the second coupling arrangements (115, 116) only allow the two sensing cells (105, 106) to move in mutually opposite directions in the y-axis direction, but prevent the sensing cells from moving in the same direction.

The coupling levers (108, 109) coupling the primary masses (101, 102) Coriolis masses (103, 104) may enable a number of different modes of primary motion that differ from each other not only by relative directions of movement of different structural parts, but also by nominal frequencies of the different modes of motion. The wanted first mode of primary motion preferably appears at a low frequency compared to other, unwanted parasitic modes of primary motion.

Figure 4A:
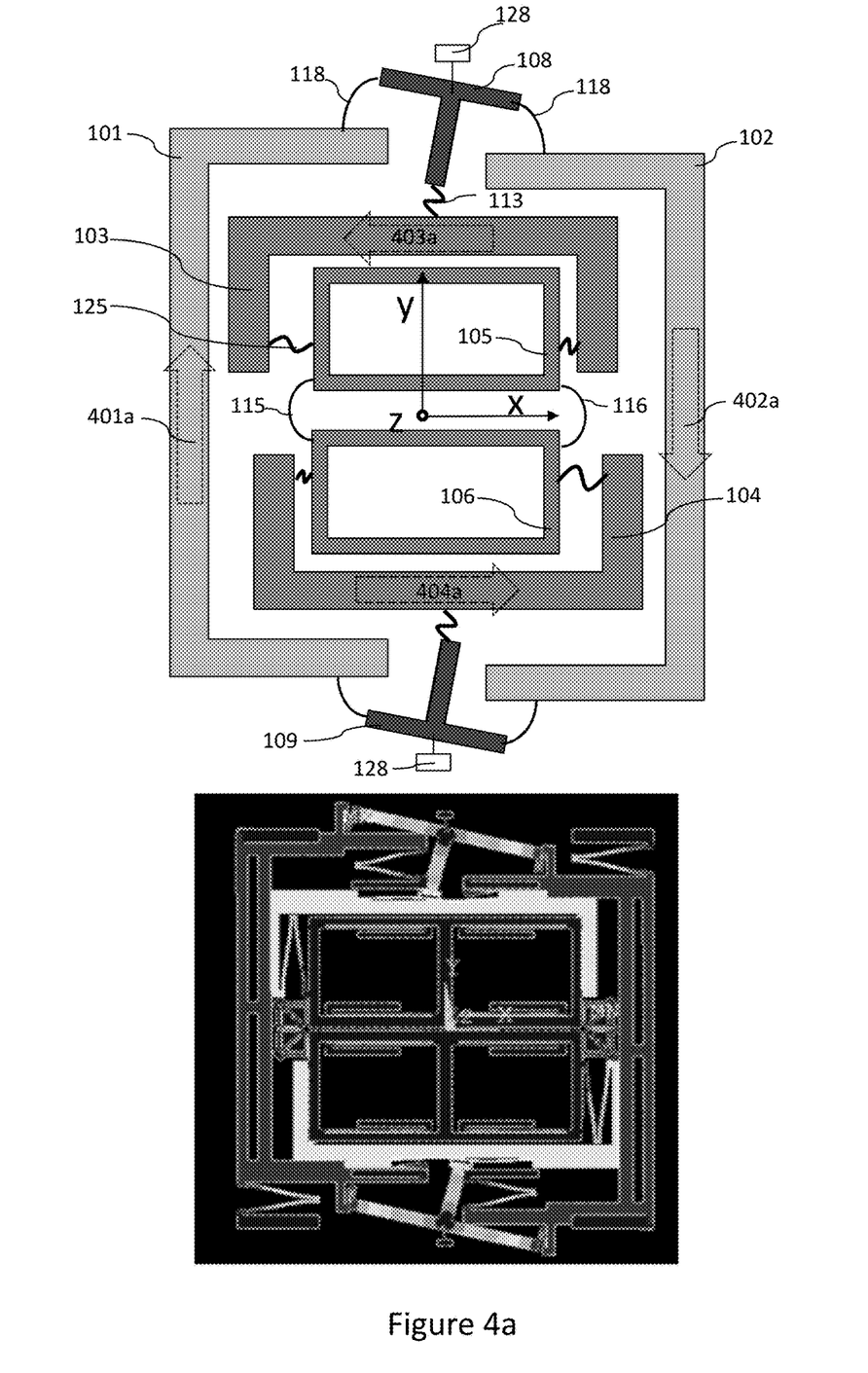
FIGS. 4a and 4b illustrate the primary motion of the Coriolis masses.
Figure 4B:
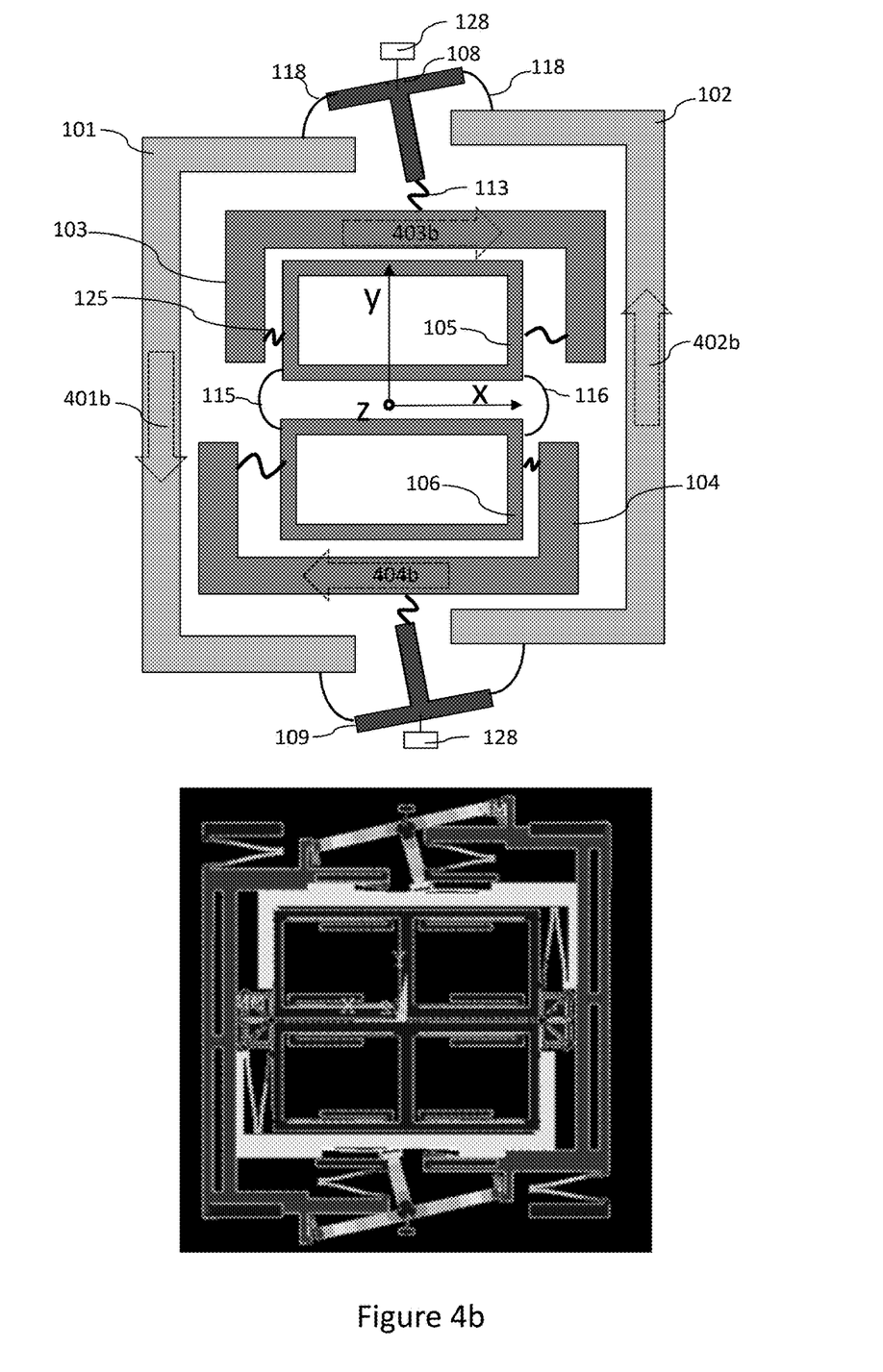

FIGS. 4a and 4b describe a first mode of primary motion, which represents the preferred combined primary motion enabled by the coupling levers (108, 109). Upper part of FIGS. 4a and 4b illustrate a schematic view of the motion illustrated with a schematic presentation like in FIG. 1a, while the lower part shows a simulation result of the exemplary structure of FIG. 1b, which also shows how various springs change their form during the disclosed motion phases. Displacement and deformation of moving elements in the simulation illustration may be exaggerated from actual displacement and/or deformation of actual moving elements in a physical device for visualization.

The sensor element is preferably excited by causing the two primary masses (101, 102) to move in essentially linear primary oscillation motion, oscillating along first axes aligned with the y-axis, within the plane of the device. Each primary mass (101, 102) move along a different first axis, parallel to the common y-axis direction symmetry axis of the sensor element. These two motion axes of the primary masses (101, 102) are located at a non-zero distance from the y-axis and at a non-zero distance from the axis of motion of the other primary mass. When the sensor element is not excited by external forces, moveable parts of the sensor element remain in a position that we may call the equilibrium state. Primary masses (101, 102) may be excited into an oscillation with a given frequency so that the primary masses (101, 102) first move away from the equilibrium state until they reach a set amount of displacement from the equilibrium state, and then move back towards the equilibrium state, and further continue the movement to the opposite direction to a set amount displacement, and again the direction of the movement changes to return to the equilibrium state. In order to facilitate balanced oscillation, the amount of displacement of each of the two primary masses (101, 102) from its position in the equilibrium state in opposite directions is preferably equal, but in opposite direction. In FIG. 4a, the first primary mass (101) has moved upwards in the direction of the positive y-axis, and the second primary mass (102) has moved downwards in the direction of the negative y-axis. Thus, the two primary masses (101, 102) move linearly in opposite directions along their respective first axes located in parallel at non-zero distance from each other. It can be also said that the phases of the linear primary oscillation motions of the two primary masses are opposite. The direction of the movement which has brought the primary masses (101, 102) in their current position is indicated in the schematic presentation with vertical dotted line arrows (401a, 402a) in the FIG. 4a. We can also notice that to reach their current positions after first being in the equilibrium state shown for example in FIG. 1b, the primary masses (101, 102) have moved to a direction that has a component of momentum perpendicular to the radius vector in clockwise direction about a common axis of rotation (z-axis) located in the geometrical centre of the entire sensor structure, which is also the sensing axes of the z-axis gyroscope element. This component of the momentum causes a downward angular momentum in a direction perpendicular to the plane of the device. In the next half cycle of the primary oscillation motion, the primary masses (101, 102) have a component of momentum perpendicular to the radius vector in counter clockwise direction, and the half cycle finally brings the primary masses to a position shown in FIG. 4b, which can be described as being mirror image of FIG. 4a, when mirrored with respect to the y-axis. This motion causes an upward angular momentum in a direction perpendicular to the plane of the device. The direction of motion of the primary masses (101, 102) which brings the primary masses to the position shown by FIG. 4b is indicated with vertical dotted line arrows (401b, 402b). The oscillation cycle continues back towards the position as shown in FIG. 4a, where the primary masses (101, 102) have a momentum with a component perpendicular to the radius in clockwise direction about the axis of rotation (z-axis), causing a downward angular momentum. During the linear primary oscillation motion, the movement of the primary masses (101, 102) and thus also the Coriolis masses (103, 104) may even have some other movement components such as unwanted quadrature movement and/or excess linear momentum because of possible imbalance of the primary masses (101, 102) in addition to the intended linear primary oscillation motion. In view of the current invention aiming to an improved primary mode, the main interest with respect to the primary masses (101, 102) is the linear primary oscillation motion and the angular momentum at the axis of rotation (z-axis) caused by this linear oscillation motion in the primary mode, where the two primary masses (101, 102) oscillate in opposite phases and cause a net (sum) angular momentum with reference to the common axis of rotation (z-axis) in the geometrical center of the sensor element.

The linear primary oscillation motion of the primary masses (101, 102) and the first coupling arrangement causes the Coriolis masses (103, 104) to be also excited into an oscillating primary motion. This motion may called the primary motion of the Coriolis masses (103, 104). The linear oscillation motion of the primary masses (101, 102) is relayed by the coupling levers (108, 109) towards the Coriolis masses (103, 104), causing the Coriolis masses (103, 104) to start their own characteristic linear primary motion. The first and second springs (118, 113) and the coupling levers (108, 109) combining the primary masses (101, 102) and the Coriolis masses (103, 104) together cause forces effecting the Coriolis masses (103, 104), and they start an oscillating primary motion with a frequency set by the linear primary oscillation motion of the primary masses (101, 102). During the linear primary oscillation motion, the movement of the primary masses (101, 102) and thus also the Coriolis masses (103, 104) may even have some other movement components such as unwanted quadrature movement and/or excess linear momentum because of possible imbalance of the primary masses (101, 102) in addition to the intended linear primary oscillation motion. Quadrature movement of the Coriolis masses (103, 104) may be reduced by any method known to a person familiar with the art. Quadrature motion caused to the Coriolis masses (103, 104) may be corrected for example by providing specific quadrature compensation electrodes on Coriolis masses (103, 104).

Even the amplitudes of the primary motion of the primary masses (101, 102) and the Coriolis masses (103, 104) are coupled through the T-shaped coupling levers (108, 109). Ratio of the amplitudes between the primary masses (101, 102) and Coriolis masses (103, 104) when excited into the primary motion is one of the most important design matters when optimizing and/or minimizing the total momentum of the sensor element design to a value that is as close to zero as possible. This ratio of the amplitudes may be controlled by adjusting the masses and length of the horizontal and vertical legs of the coupling levers (108, 109).

The stiff coupling levers (108, 109), each coupled to three moving masses with springs, enable the respective Coriolis mass (103, 104) to be excited into the essentially linear primary motion essentially in the x-axis direction, thus perpendicular to the axis of the essentially linear primary motion of the primary masses (101, 102) in the y-axis direction. It should be noticed, that while referring to a motion that is essentially linear, we refer to a motion which is designed to be linear, but may have some rotational components and/or some linear components deviating from the intended linear motion for example due to manufacturing tolerances or other like non-idealities.

FIGS. 4a and 4b further illustrate the primary motion of the Coriolis masses (103, 104). In the primary motion, each Coriolis mass (103, 104) move linearly along second axes, which are parallel to the x-axis direction symmetry axis of the sensor device, and located at a non-zero distance from the x-axis and at a non-zero distance from the second axis of the other Coriolis mass. The second axes along which the Coriolis masses move while in primary motion, are orthogonal to the first axes along which the primary masses move while in primary motion. FIG. 4a illustrates a phase of the primary motion after the first Coriolis mass (103) has moved towards left, in direction of the negative x-axis. At the same time, the second Coriolis mass (104) has moved towards right, in direction of the positive x-axis. The direction of the movement which has brought the Coriolis masses (103, 104) in their current position is indicated in the schematic presentation with horizontal dotted line arrows (403a, 404a). We can also notice that to reach the current position of the Coriolis masses (103, 104) after first being in the equilibrium state, the Coriolis masses (103, 104) have moved to a direction that has momentum in counter-clockwise direction about the axis of the sensor element, and thus upward angular momentum. This angular momentum is opposite in direction to that of the primary masses (101, 102) during the same phase of the primary motion. Thus, total angular motion caused by the primary motions of the primary masses (101, 102) and the Coriolis masses (103, 104) effectively cancel each other, reducing the total angular momentum caused by the combined primary motion. By designing the masses and distances of the primary and Coriolis masses suitable, the angular momentum this way cancelling each other may be optimized so that momentary opposite angular momentum of elements are approximately equal in size, and then opposite in direction, cancel each other effectively.

FIG. 4b illustrates a second phase of the primary motion after the first Coriolis mass (103) has moved towards right, in direction of the positive x-axis. At the same time, the second Coriolis mass (104) has moved towards left, in direction of the negative x-axis. We can also notice that to reach the current position of the Coriolis masses (103, 104) after first being in the position illustrated by FIG. 4a, the Coriolis masses (103, 104) have moved to a direction that has momentum in clockwise direction about the axis of rotation (z-axis) located in the geometrical centre of the sensor element, and thus downward angular momentum. The direction of the movement which has brought the Coriolis masses (103, 104) in their current position is indicated in the schematic presentation with horizontal dotted line arrows (403b, 404b). This angular momentum is again opposite to that of the primary masses (101, 102) during the same phase of the primary motion, and the total angular momentum caused by the combined primary motion of the primary and Coriolis masses is effectively reduced. Preferably, the total angular momentum of the moving elements of the sensor is minimized so that it is essentially zero.

FIGS. 4a and 4b further illustrate that during the primary motion, the sensing cells (105, 106) do not move in any direction, but remain in their equilibrium position.

FIGS. 4a and 4b present a first primary mode, in which the linearly moving masses (101, 102) and Coriolis masses (103, 104) move in a manner that can be called the first primary mode. In this mode, the Coriolis masses (103, 104)

cause an angular momentum that is always opposite to that of the angular momentum of the primary masses (101, 102). For example, when the primary masses (101, 102) reach the position where they're reached the peak position after moving in a direction that causes the primary masses (101, 102) to have downward angular momentum caused by momentum component in clockwise direction, the Coriolis masses (103, 104) reach their peak position after rotating into counter clockwise direction. During the movement towards this peak position, the Coriolis masses (103, 104) have an angular momentum with reference to the axis of rotation (z-axis) located in the centre of the sensor element, which is in the opposite direction from the angular momentum caused by the movement of the primary masses (101, 102). Similar situation and relative direction of angular momenta continues when the oscillation turns to next half phase of oscillation. The primary masses (101, 102) have an upward combined angular momentum with respect to the rotation axis (z-axis) located in the origin, i.e. in the geometrical centre of the sensor element that is caused by momentum component in counter clockwise direction, whereas the Coriolis masses (103, 104) have a downward angular momentum in caused by momentum component in clockwise direction with respect to the same rotation axis (z-axis). Based on the design and the inertia of the primary and Coriolis masses, coupling levers, springs and the whole structure of the sensor element system, there is a certain frequency at which the system reaches such steady anti-phase oscillation motion. The frequency can be called as the nominal frequency of the first primary mode. When the primary masses (101, 102) and Coriolis masses (103, 104) have been designed properly, the sum of angular momentum of the primary masses (101, 102) is opposite and nearly equal in strength as the angular momentum of the Coriolis masses (103, 104), so that the angular momenta cancel each other to high extent, and the remaining total angular momentum of the oscillating system is very low as compared to almost any other mode of oscillation that is possible for the system.

The ratio of the remaining total angular momentum of the moving masses in the system may be described as:

$$\frac{|Lprimary1 + Lprimary2| - |LCoriolis1 + LCoriolis2| + |LCoriolisT1 + LCoriolisT2|}{|Lprimary1 + Lprimary2| + |LCoriolis1 + LCoriolis2| + |LCoriolisT + LCoriolisT2|} = Lremaining \quad [1]$$

Where $L_{primary1}$ and $L_{primary2}$ stand for the angular momentum of the primary masses (101, 102) respectively, $L_{Coriolis1}$ and $L_{Coriolis2}$ stand for the angular momentum of the Coriolis masses (103, 104) respectively, and $L_{CoriolisT1}$ and $L_{CoriolisT2}$ stand for the total angular momentum of the coupling levers (108, 109). The angular momentum $L_{primary1}$, $L_{primary2}$ of the primary masses (101, 102) is understood to comprise the component of the total momentum of the primary masses (101, 102) that has the direction of a tangent for a radius drawn from the geometrical centre of the sensor element at any moment. While the primary masses (101, 102) movement is not rotational, the radius between the centre of the rotor sensor element and the centre of gravity of each of the primary masses (101, 102) changes slightly over time when the primary masses (101, 102) are in the linear primary oscillation motion. The coupling levers (108, 109) are relatively small compared to the primary masses (101, 102) and the Coriolis masses (103, 104) and thus the angular momentum caused by the coupling levers (108, 109) is relatively low. The first primary mode of FIG. 4a occurs when the frequency of the oscillation of the primary masses (101, 102) is preferably lower than the frequency of the oscillation in any other primary mode enabled by the sensor element structure. A distinctive difference in between the preferred nominal oscillation frequency and any other possible resonance frequencies of the sensor element structure facilitates robustness of the device. With suitable dimensioning the Coriolis masses (103, 104) and the primary masses (101, 102) (and optionally also the coupling levers (108)), the remaining total momentum of the system $L_{remaining}$ in this preferred primary mode may be 5% or less than the sum of the absolute values of the angular momenta of these masses. For example, the total angular momentum value of 4% or even less than 1% of the sum of the absolute values of the angular momenta has been achieved in simulations when the sensor element is excited into the first primary mode, depending on the design of the moving elements.

In addition to the first primary mode illustrated in FIGS. 4a and 4b, this sensor element structure has at least a second primary mode that may be called as a parasitic mode in which the relative motions of the linearly moving masses (101, 102) and the Coriolis masses (103, 104) have different relationship from that of the first primary mode. In a second primary mode the total angular momentum of parasitic mode has a total momentum which at least during part of the parasitic primary motion cycle corresponds to the sum of the absolute values of the momenta of the linearly moving masses (101, 102) and the Coriolis masses (103, 104).

However, when the design of the sensor element is made correctly, the second primary mode (parasitic mode) of oscillation has a clearly higher nominal frequency than the first primary mode of oscillation. While the two oscillations are clearly distinct in frequency, the sensor element structure can be excited to the wanted first primary mode oscillation with high reliability. In the exemplary design illustrated in FIG. 1b, simulations indicate that the first primary mode has a nominal frequency of about 18 kHz. Enabling use of a low nominal frequency for the preferred primary mode provides benefits for the sensor element. For example, the first primary mode is easy to be excited. When the first primary mode is set as the lowest nominal frequency mode, mechanical robustness of the sensor element is facilitated.

A sensor element as described here, having multiple moving parts may have one or more further parasitic modes. While the first, preferred primary mode we have described (the first primary mode) may be the preferred primary mode, we may call all other primary modes as parasitic modes. A clear nominal frequency separation between the preferred operation mode (the first mode) and any parasitic operation modes also improves stability of the preferred first primary mode. Thus, it's beneficial if the design of the sensor element facilitates only parasitic modes which have nominal frequencies which are as far from the preferred primary mode as possible. Different parasitic primary modes may have lower or higher frequency than the preferred first primary mode.

Figure 5:
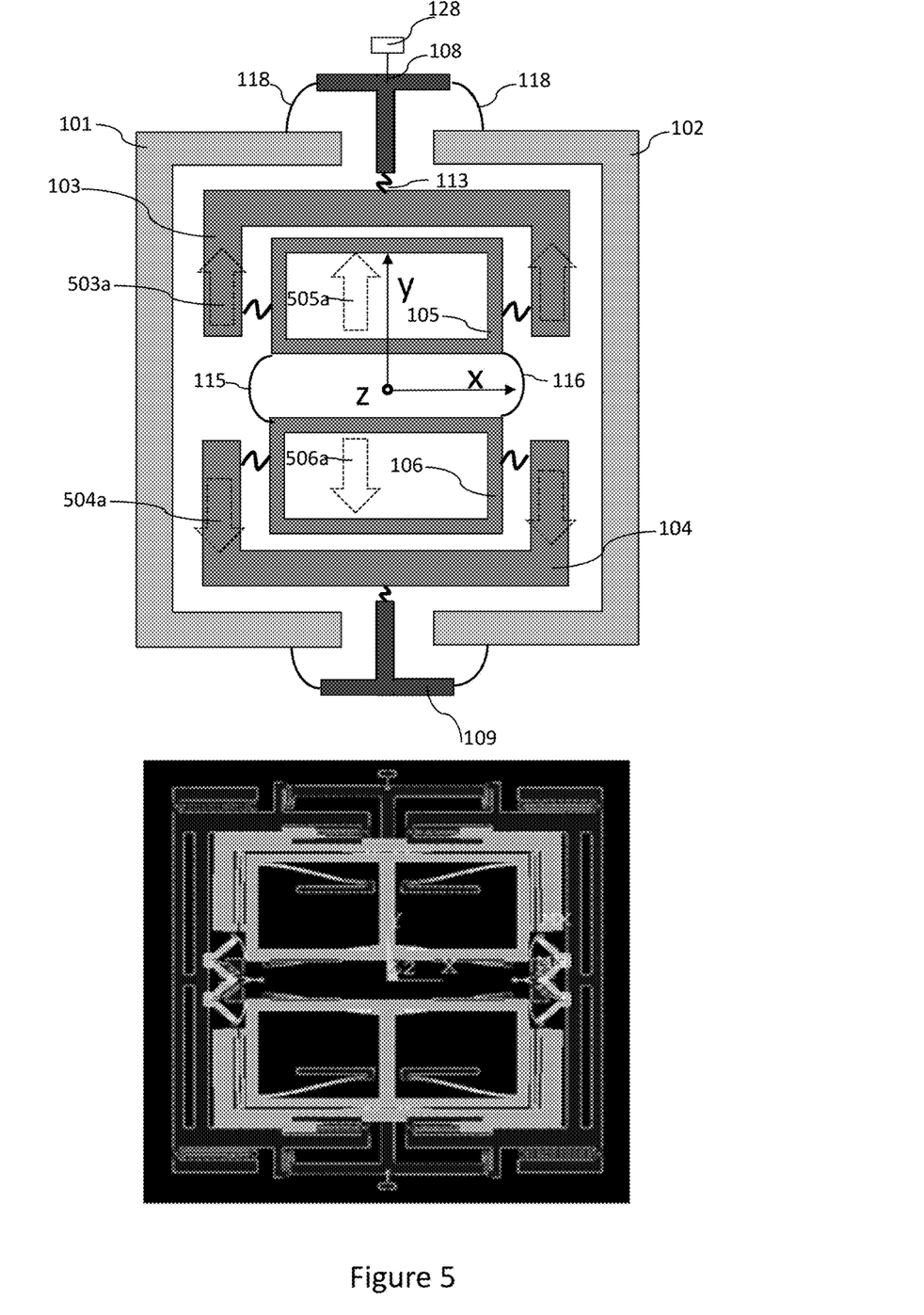
FIG. 5 illustrates secondary motion of the sensor element.

FIG. 5 illustrates secondary motion of the sensor element. Again, the upper part of FIG. 5 illustrates a schematic view of the secondary motion, whereas the lower part shows a result of a simulation of the secondary motion of a sensor element as shown in FIG. 1b. The secondary motion, also known as secondary mode or sense mode or sense motion, is caused by Coriolis force affecting the Coriolis masses (103, 104), which are under primary motion. This secondary motion occurs in the y-axis direction. When the Coriolis masses (103, 104) move in the y-axis direction, the fifth springs (125) coupling each Coriolis frame (103; 104) to a sensing cell (105; 106) cause the sensing cells (105, 106) to move in the y-axis direction. The sensing cells (105, 106) may comprise capacitive sensing combs, which provide different value of capacitive load depending on the position of the sensing cell in y-axis direction. Alternatively, the sensing cells (105; 106) may use other known sensing methods such as piezoelectric sensing. While the secondary motion of both the Coriolis frames (103, 104) and the sensing cells (105, 106) occur in y-axis direction along the symmetry axis of the sensor element, the sense motion does not cause any angular momentum around the z-axis or linear momentum along the x- and/or the y-axis.

The second coupling arrangements (115, 116) have a spring constant which, when coupling the masses of the Coriolis frames (103, 104) and the sensing cells (105, 106) have a nominal frequency for a first secondary motion which may be equal to the nominal frequency of the first primary mode of the primary masses (101, 102) and the Coriolis masses (103, 104), or the two frequencies may be configured to be within a specified frequency distance. For example, the frequency distance may be less than 25% of the first primary frequency in a conventional frequency separation type gyroscope, or the frequencies may be configured to be essentially equal in a mode match type gyroscope (frequency match type gyroscope), so that the frequency distance is less than 1% of the first primary frequency. For example, simulations of a mode match type gyroscope have been performed where the nominal frequency of the first primary motion is 17.9 kHz, and the differential first secondary motion has a nominal frequency of 18.1 kHz. If the primary and secondary mode frequencies match while the Coriolis force undulates at the frequency of the first primary motion, the induced secondary motion also occurs at the nominal frequency at which the secondary motion is in the preferred first secondary mode, where Coriolis mass (103) and sensing cell (105) above the x-axis always move to opposite direction (503a, 505a) along the y-axis to the direction (504a, 506a) of the Coriolis mass (104) and the sensing cell (106) below the x-axis. This kind of balanced anti-phase secondary motion minimizes any vibration caused by the secondary motion. Dotted arrows (503a, 505a, 504a, 505a) illustrate the directions of movement of the Coriolis masses (103, 104) and the sensing cells (105, 106) which have brought these masses into their current position. After reaching the maximum displacement in the y-axis direction, the secondary motion reverses so that directions of motion of the Coriolis masses (103, 104) and sensing cells (105, 106) reverse from those shown in FIG. 5, and the upper pair of Coriolis mass (103) and sensing cell (105) moves towards the lower pair of Coriolis mass (104) and sensing cell (106).

FIG. 5 also highlights some further benefits of the sensor element design. Primary masses (101, 102) are completely decoupled from the sensing cells (105, 106). Sensing cells (105, 106) are preferably disposed in immediate vicinity of the geometrical centre of the sensor element.

Decoupling the sensing cells (105, 106) from the primary masses provides some specific benefits, which will be discussed next.

When capacitive sensing is used in the sensor element configured for detection motion in the y-axis direction, electrode fingers extend in the y-axis direction so that moving electrode fingers are coupled to the sensing cells (105, 106), moving along the sensing cells (105, 106) and stationary electrode fingers (a.k.a. stators or stator structures) are coupled to the rigid body of the sensor element, so that moving and stationary electrode fingers are interlaced. In this example, the stators are used together with the moving electrode fingers for detecting movement of the sensing cells (105, 106) along the y-axis. The primary masses (101, 102) and the sensing cells (105, 106) are suspended with suspension structures so that the mean of anchoring positions should preferably be the same for the primary masses (101, 102) and the sensing cell (105, 106) moving masses. Further, the stator structures (not shown) inside the sensing cells (105, 106) are preferably anchored to the sensor element body so that the mean of their anchoring positions is the same as the mean of the anchoring positions of the primary masses. When the suspension structures and thus anchoring positions of the sensing cells (105, 106) are symmetrical in view of the x-axis, an equalized sensing cell (105, 106) movement is facilitated in the x-axis direction but any motion of the sensing cells (105, 106) is deprived in the y-axis direction. This way the relative displacement between moving sensing cells (105, 106) and respective stator structures doesn't change in the x-axis direction by deformation due to thermal stress or mechanical stress, which may be caused for example in case of using an over-mold package to protect the sensor element.

When the two primary masses (101, 102) are located far from the sensor element geometrical centroid in the xy-plane, achieving a well-equalized sensing motion is probable in x-axis direction but not realistic in the y-axis direction.

Also decoupling the primary masses (101, 102) and the Coriolis masses (103, 104) from each other by the coupling levers (108, 109) and first and second springs (113, 118) provides benefits for the design. If the Coriolis masses (103, 104) were directly connected to the primary mass, neutral positions of the Coriolis masses (103, 104) along the x-axis may be affected by anchoring of the primary masses (101, 102), which may not be preferable. But in the present design, each Coriolis mass (103, 104) is supported by coupling beam (108, 109) disposed in the middle of two primary masses (101, 102), thus such undesirable side effect is cancelled. In addition, tensile or compressive forces occurring between two primary masses (101, 102) are relaxed by flexibility of the first springs (118) coupling the coupling lever at connecting point to primary masses (101, 102).

Figure 6:
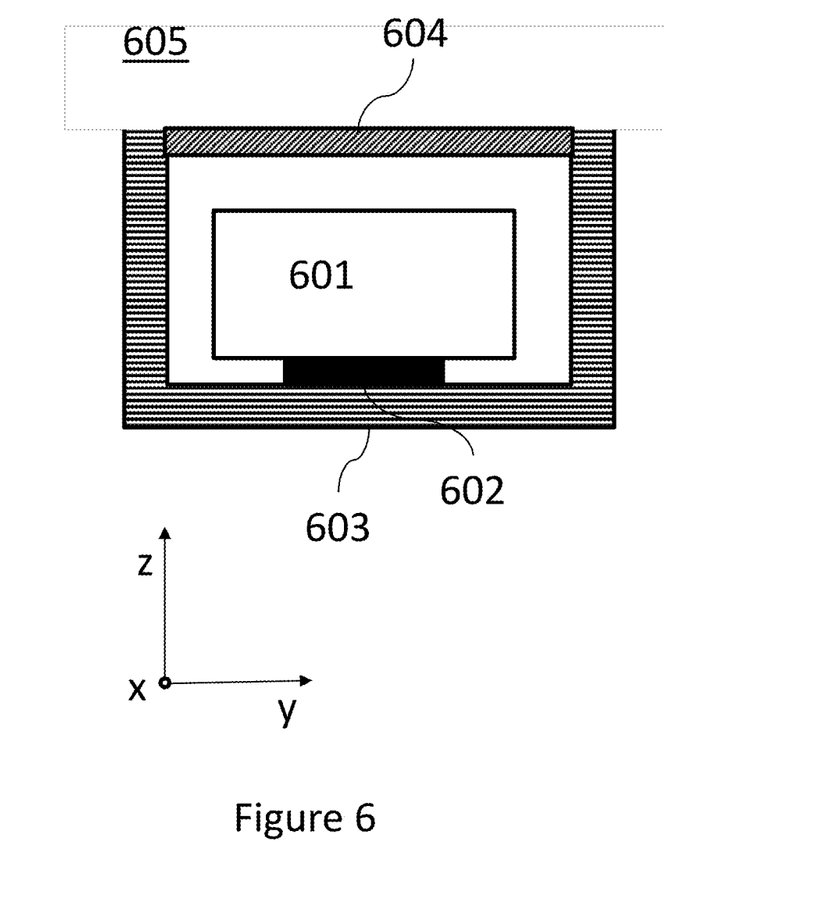
FIG. 6 illustrates a sensor device disposed inside a housing.

FIG. 6 presents schematically a sensor device (605), where the sensor element (601), comprising inertial elements like the ones described in FIGS. 1a, 1b and the device body supporting the inertial elements, is disposed inside a housing (603), which may be comprise a pre-molded or overmolded package made of plastic material, a ceramic package or a chip size package. The sensor element (601) is disposed inside a housing (603), and attached to the housing with adhesive (602). The housing is covered with a cap (604), which may be i.e. made out of metal such as nickel iron alloy, or out of plastic material.

Having a low total momentum for an oscillating system provides significant benefits. When the total momentum of the sensor element (601) due to primary oscillation motion is near to zero, the sensor device (605) does not cause any vibration towards its environment, so that the necessary vibration of the moveable parts of the sensor element occurring inside the sensor device (605) cannot be detected from outside. There is no or very little vibrational energy leaking to the outside of the sensor element (601), which leaking could cause problems in example for instance stability of sensor device (605) Q-value. Even if hard adhesive such as epoxy was used for attaching the sensor element (601) to its housing (603), low or zero total momentum would decrease or eliminate the influence of leaking of the vibrational energy out of the sensor device (605). However, use of hard adhesive may further cause increase in mechanical interference towards the sensor element (601). In example, interference from another resonator located nearby the sensor device (605), such as another sensor or other vibrating part with a resonance frequency close to the one of the sensor element (601), may be increased if hard adhesive was used. Thus, it has been found that capability to use soft adhesive is beneficial.

When the oscillating sensor element (601) does not itself cause any significant vibration towards the housing (603), use of soft adhesive (602) is enabled for mounting the vibrating sensor element (601) to the housing (603). In case there was a total non-zero momentum from the sensor element (601) and it was attached to the housing (603) using soft adhesive (602), the sensor element (601) might move inside the housing (603), which is not acceptable. A zero or very low momentum sensor element (601) allows use of soft adhesive (602) for attaching the sensor element (601) into the housing (603). Use of soft adhesive (602), such as silicon, is beneficial and worth pursuing, since it reduces the external stress through the adhesive (602) from or through the housing and package, i.e. due to temperature changes. Thus, use of soft adhesive (602) enables better bias stability and sensing stability of the sensor device over changing temperatures. Low total momentum also improves total stability of driving oscillation (primary mode), which is especially important during the starting up of the sensor element (601), or when external shocks occur towards the sensor device (605).

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A vibrating angular velocity sensor element, comprising:
    a supporting body;
    at least two primary masses and at least two Coriolis masses suspended to vibrate in respect of the supporting body, the primary masses and the Coriolis masses in a stationary suspended state forming a reference plane of the angular velocity sensor element; and
    at least two coupling lever structures, each of the coupling lever structures being coupled to the two primary masses and to one of the two Coriolis masses,
    wherein the two primary masses are suspended to the supporting body by a spring structure that enables a linear primary oscillation motion of the two primary masses in a first direction along the reference plane, and disables motion of the two primary masses in any of the other directions,
    wherein each of the two coupling lever structures is configured to relay an anti-phase primary motion of the two primary masses to a linear primary oscillation motion of the one coupled Coriolis mass, which linear primary oscillation motion of the one coupled Coriolis mass occurs in a second direction along the reference plane, and
    wherein the second direction is perpendicular to the first direction, whereby the anti-phase primary motion of the two primary masses is relayed to an anti-phase primary motion of the two Coriolis masses.

2. The angular velocity sensor element of claim 1, wherein the two coupling lever structures are disposed symmetrically on opposite sides of a first symmetry axis of the angular velocity sensor element traversing through a geometrical centroid of the angular velocity sensor element.

3. The angular velocity sensor element of claim 2, wherein the primary masses are disposed symmetrically on opposite sides of a second symmetry axis of the angular velocity sensor element traversing through the geometrical centroid of the angular velocity sensor element, the second symmetry axis being orthogonal to the first symmetry axis.

4. The angular velocity sensor element of claim 1, wherein:
    the angular velocity sensor element is essentially planar;
    the angular velocity sensor element further comprises means for exciting the two primary masses into the linear primary oscillation motions within the reference plane of the angular velocity sensor element along two parallel first axes having a non-zero distance from each other;
    the two coupling lever structures are coupled with a first set of springs to the two primary masses and configured to mutually couple the linear primary oscillation motions of the primary masses, causing the linear primary oscillation motions of the primary masses to have mutually opposite phases at a first nominal frequency; and
    the two coupling lever structures are further coupled with a second set of springs to the two Coriolis masses and configured to relay the anti-phase primary oscillation motion of the primary masses into the anti-phase primary motions of the Coriolis masses at the first nominal frequency within the reference plane of the angular velocity sensor element along two parallel second axes having a non-zero distance from each other, wherein the second axes of the anti-phase primary motions of the Coriolis masses are orthogonal to said two parallel first axes of the anti-phase primary motions of the primary masses, and wherein the anti-phase primary motions of the Coriolis masses have mutually opposite phases at the first nominal frequency.

5. The angular velocity sensor element of claim 1, wherein:
    ends of each one of the at least two coupling lever structures coupled to the primary masses and the Coriolis masses form an isosceles triangle; and/or
    each of the at least two coupling lever structures comprises a second lever attached to a first lever in approximately middle of a length of the first lever; and
    the second lever and the first lever are attached in an angle of 90 degrees.

6. The angular velocity sensor element of claim 1, wherein a combined primary mode comprising primary oscillation motions of the at least two primary masses, the at least two Coriolis masses, and the two coupling lever structures, has a total angular momentum that is less than 5% of the sum of absolute values of the angular momenta of the two primary masses, the at least two coupling lever structures and the two Coriolis masses.

7. The angular velocity sensor element of claim 4, wherein the Coriolis masses are further configured to be excited by a Coriolis force into first anti-phase linear secondary motions within the reference plane of the angular velocity sensor element along a third axis orthogonal to the second axes of the anti-phase primary motions of the Coriolis masses, when the angular velocity sensor element is subject to angular velocity about a detection axis during operation.

8. The angular velocity sensor element of claim 7, wherein the angular velocity sensor element further comprises two sensing cells and the Coriolis masses are coupled to the sensing cells with third set of springs, the third set of springs causing the sensing cells to be excited into second anti-phase linear secondary motions along an axis aligned with the third axis of the first anti-phase linear secondary motions of the Coriolis masses.

9. The angular velocity sensor element of claim 8, wherein the sensing cells are mutually coupled with a first coupling arrangement disposed symmetrically on a first symmetry axis so that the first coupling arrangement extends an equal amount on both sides of the first symmetry axis, the first coupling arrangement causing said second anti-phase linear secondary motions of the sensing cells to have a second nominal frequency and the sensing cells to move in mutually opposite phases at the second nominal frequency.

10. The angular velocity sensor element of claim 9, wherein the angular velocity sensor element is a frequency separation type gyroscope and the second nominal frequency deviates from the first nominal frequency less than 25% of the first nominal frequency.

11. The angular velocity sensor element of claim 9, wherein the angular velocity sensor element is a mode match type gyroscope, and the second nominal frequency is essentially equal to the first nominal frequency.

12. A method for operating a vibrating, essentially planar sensor element, for detecting angular velocity about a detection axis perpendicular to a plane of the sensor element, the sensor element comprising:
 a supporting body,
 at least two primary masses and at least two Coriolis masses suspended to vibrate in respect of the supporting body, the primary masses and the Coriolis masses in a stationary suspended state forming a reference plane of the sensor element, and
 at least two coupling lever structures, each of the coupling lever structures being coupled to the two primary masses and to one of the two Coriolis masses, the method comprising:
  suspending the two primary masses to the supporting body by a spring structure that enables a linear primary oscillation motion of the two primary masses in a first direction along the reference plane, and disables motion of the two primary masses in any of the other directions; and
  relaying, by each of the two coupling lever structures, an anti-phase primary motion of the two primary masses to a linear primary oscillation motion of the one coupled Coriolis mass, which linear primary oscillation motion of the one coupled Coriolis mass occurs in a second direction along the reference plane, wherein the second direction is perpendicular to the first direction, whereby the anti-phase primary motion of the two primary masses is relayed to an anti-phase primary motion of the two Coriolis masses.

13. The method according to claim 12, further comprising:
 exciting the two primary masses into the linear primary oscillation motions within the reference plane of the sensor element along two parallel first axes having a non-zero distance from each other;
 coupling the two coupling lever structures with a first set of springs to the two primary masses for mutually coupling the linear primary oscillation motions of the primary masses, causing the linear primary oscillation motions of the primary masses to have mutually opposite phases at a first nominal frequency; and
 coupling the two coupling lever structures with a second set of springs to the two Coriolis masses for relaying the anti-phase primary motion of the primary masses into the anti-phase primary motions of the Coriolis masses at the first nominal frequency, wherein the anti-phase primary motions of the Coriolis masses are configured to occur within the reference plane of the sensor element along two parallel second axes having a non-zero distance from each other, wherein the second axes of the anti-phase primary motions of the Coriolis masses are orthogonal to said two parallel first axes of the anti-phase primary motions of the primary masses, and wherein the anti-phase primary motions of the Coriolis masses have mutually opposite phases at the first nominal frequency.

14. The method of claim 12, wherein a combined primary mode comprising primary oscillation motions of the at least two primary masses, the at least two Coriolis masses, and the two coupling lever structures, has a total angular momentum that is less than 5% of the sum of absolute values of angular momenta of the two primary masses, the at least two coupling lever structures and the two Coriolis masses.

15. The method of claim 13, further comprising:
 exciting the Coriolis masses into first anti-phase linear secondary motions within the reference plane of the sensor element along a third axis orthogonal to the second axes of the anti-phase primary motions of the Coriolis masses, when the sensor element is subject to angular velocity about a detection axis during operation.

16. The method of claim 15, further comprising:
 coupling the Coriolis masses to sensing cells with a third set of springs, the third set of springs causing the sensing cells to be excited into second anti-phase linear secondary motions along an axis aligned with the third axis of the first anti-phase linear secondary motions of the Coriolis masses.

17. The method of claim 16, further comprising:
 mutually coupling the sensing cells with a first coupling arrangement disposed symmetrically on a first symmetry axis, wherein the first coupling arrangement extends an equal amount on both sides of the first symmetry axis, the first coupling arrangement causing second anti-phase linear secondary motions of the sensing cells to have a second nominal frequency and the sensing cells to move in mutually opposite phases at the second nominal frequency.

18. The method of claim 17, wherein the sensor element is a frequency separation type gyroscope and the second nominal frequency deviates from a first nominal frequency less than 25% of the first nominal frequency.

19. The method of claim 17, wherein the sensor element is a mode match type gyroscope and the second nominal frequency is essentially equal to a first nominal frequency.

20. A sensor device comprising the angular velocity sensor element of claim 1.

* * * * *